United States Patent Office 2,869,997
Patented Jan. 20, 1959

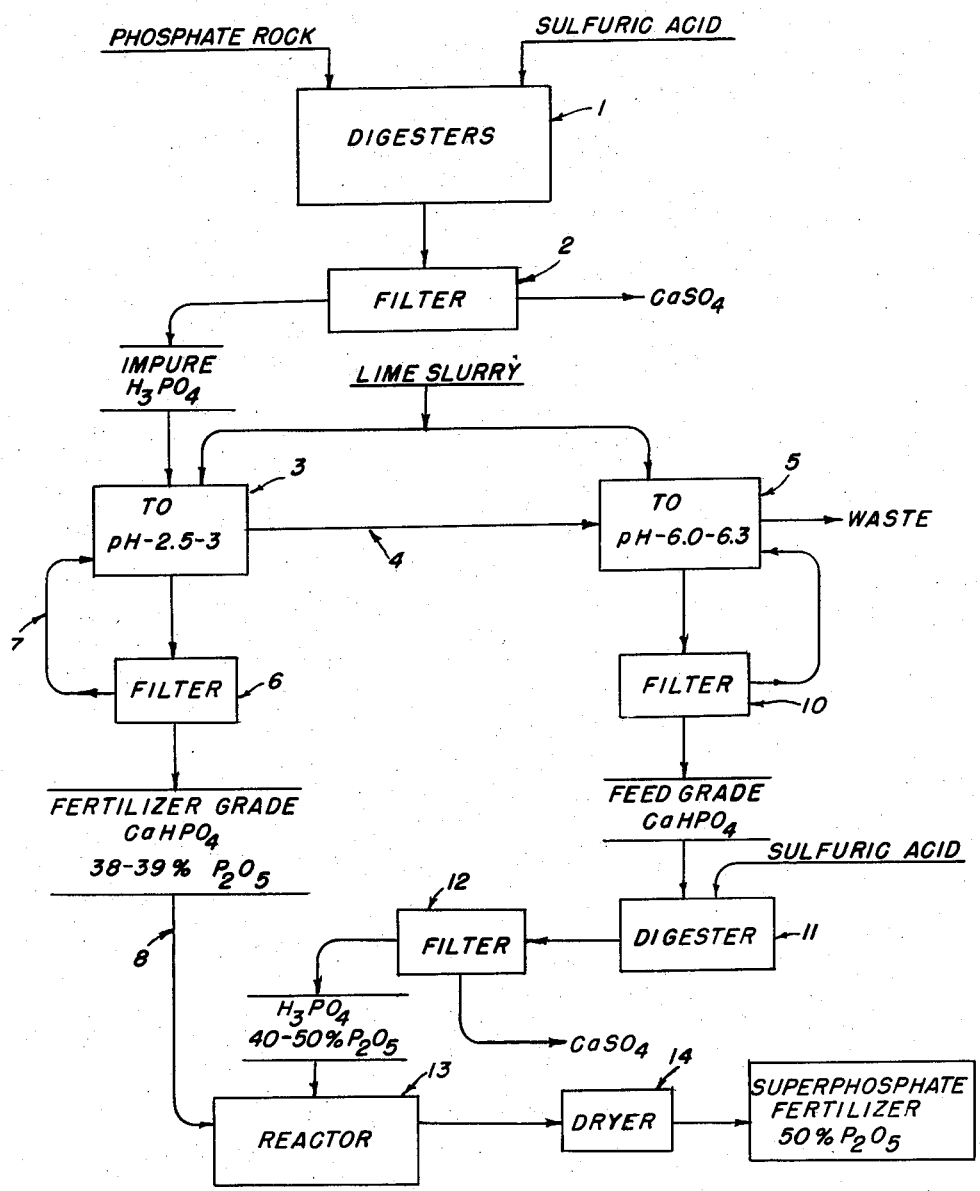

2,869,997

PRODUCTION OF CONCENTRATED SUPERPHOSPHATE FERTILIZERS

Sydney Atkin, Springfield, N. J., assignor to Chemical Construction Corporation, New York, N. Y., a corporation of Delaware Application September 12, 1955, Serial No. 533,717

2 Claims. (Cl. 71—40)

This invention relates to the production of phosphate fertilizers having a high percentage of available $P_2O_5$, and more particularly to a process for the production of such fertilizers wherein the necessity of concentrating aqueous phosphoric acid is avoided.

The conventional procedure for producing triple superphosphate fertilizer containing 45–48% of available $P_2O_5$ is based on the digestion of phosphate rock with sulfuric acid to produce phosphoric acid of about 25–28% $P_2O_5$ content. This acid is then concentrated by heating to a strength corresponding to about 50–55% $P_2O_5$ and the resulting strong acid is reacted with additional ground phosphate rock by the reaction

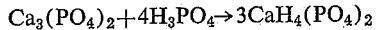
$$Ca_3(PO_4)_2 + 4H_3PO_4 \rightarrow 3CaH_4(PO_4)_2$$

The concentration of aqueous phosphoric acid to the extent necessary for this process has presented a number of problems. Even when highly efficient concentrators are used, such as the drum type concentrators wherein a flow of hot combustion gases is passed over and through the acid, there is a loss of approximately 5% of the phosphoric acid during the concentration and air pollution problems are also frequently encountered.

It is a principal object of the present invention to provide a method for the production of concentrated fertilizers such as those containing 50% and more of available $P_2O_5$ wherein the necessity of concentrating aqueous phosphoric acid is avoided. A further object is the provision of a process that is adapted to produce both a feed grade dicalcium phosphate and a triple superphosphate fertilizer in varying proportions to meet seasonal requirements of the market. Still further objects will become apparent from the following description of preferred embodiments of the invention, when taken with the appended claims.

For the accomplishment of the above and other objects the invention in its broadest aspects is based on the concept of reacting dicalcium phosphate ($CaHPO_4$) with a strong aqueous phosphoric acid obtained by the treatment of additional quantities of dicalcium phosphate with sulfuric acid by the reaction

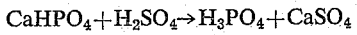
$$CaHPO_4 + H_2SO_4 \rightarrow H_3PO_4 + CaSO_4$$

As will subsequently be shown, this reaction can readily be carried out under conditions such as to produce directly a strong aqueous phosphoric acid of 40–50% $P_2O_5$ content which, when reacted with solid dicalcium phosphate, will produce a superphosphate product containing 50% or more of available $P_2O_5$.

In its more specific aspects my invention also includes an improved method for producing solid dicalcium phosphate materials for use in the process outlined above. In copending application Serial Number 314,370, in the U. S. Patent No. 2,799,557, filed October 11, 1952 by Warren R. Seyfried and myself a manufacturing process for the production both of fertilizer grade dicalcium phosphate and feed grade dicalcium phosphate is described in detail. These products are obtained by first preparing a relatively dilute aqueous phosphoric acid solution containing about 8–12% $P_2O_5$ together with most of the metallic impurities dissolved from the phosphate rock and subjecting it to a two-stage neutralization with an aqueous calcium hydroxide suspension. A minor proportion of the phosphoric acid, containing about 20–25% of the $P_2O_5$ along with the fluorine and metallic impurities in the solution, is first precipitated by neutralizing the acid with lime to a pH of about 2.5–3.2 and is recovered by filtration, after which the addition of lime is continued to a pH of about 4.8–6.3 and preferably 5.0–5.5 to bring down a highly purified dicalcium phosphate precipitate suitable for use as a cattle feed suplement. I have found that this procedure can be utilized, with or without modification, to provide the dicalcium phosphate products utilized in practicing my present invention.

The invention will be further described with reference to the accompanying drawing wherein the single figure is a flow diagram of a preferred embodiment thereof. Referring to the drawing the process illustrated consists generally in the production of an aqueous phosphoric acid by digesting ground phosphate rock with sulfuric acid, preferably in the presence of recycled aqueous phosphoric acid, followed by removal of calcium sulfate precipitate by filtration; the treatment of the aqueous phosphoric acid so obtained with lime or other calcium-containing compound to precipitate dicalcium phosphate; the treatment of a portion of the dicalcium phosphate with sulfuric acid to form concentrated phosphoric acid; and the reaction of the strong phosphoric acid so obtained with additional dicalcium phosphate to produce a superphosphate fertilizer.

The digestion of ground phosphate rock with sulfuric acid is indicated generally on the drawing by reference numeral 1. A number of such digestion procedures, producing phosphoric acid of varying degrees of concentration, are well known and may be used if desired; however, the process described in the above-identified copending application is preferred. Briefly, this process consists in slurrying ground phosphate rock with recycled aqueous phosphoric acid of about 20–23% $H_3PO_4$ content and digesting the mixture with sulfuric acid of 30–60% $H_2SO_4$ content at temperatures of about 140°–190° F. and preferably at about 165° F. for about 1.5–2 hours. The resulting slurry of gypsum crystals in aqueous 20–23% phosphoric acid is readily filterable, and is preferably filtered hot in a filtering step that is indicated on the drawing by reference numeral 2. The calcium sulfate crystals are discarded and the impure phosphoric acid is preferably cooled to about 75° F. and allowed to stand in order to settle out additional calcium sulfate, after which it may be treated with sodium chloride to precipitate about 70% of its fluorine content as sodium silicofluoride. After filtration, the phosphoric acid is preferably further diluted with water when a feed grade dicalcium phosphate of high purity is one of the desired end products and it is then ready for treatment with a calcium hydroxide slurry.

On the drawing the first liming step is indicated by reference numeral 3. It is preferably carried out by passing the phosphoric acid solution through a series of liming tanks in cascade while introducing a cold calcium hydroxide slurry containing about 7–10% CaO into the first two tanks of the series. The quantity of lime so introduced may be such as to bring the final pH to a value within the range of about 2.5–3 which has been found effective to precipitate all of the iron, aluminum and other metals present along with the remainder of the fluorine while bringing down only about 15–25% of the phosphoric acid as insoluble dicalcium phosphate. The resulting slurry is settled and the overflow from the settling tank is passed through line 4 to the second liming step, which is indicated on the drawing by reference numeral 5. In this step an additional quantity of the same lime slurry is added sufficient to bring the pH to about 4.8–6.3, which brings down all of the remaining phosphoric acid as a pure calcium phosphate without forming slimes that would otherwise interfere with the subsequent filtration. This second liming step is carried out in a series of tanks in cascade similar to those used in the first liming step 3, and both steps are carried out at temperatures of about 85°–110° F. during about 1–2 hours. After the second treatment with lime, the residual liquor is passed to waste.

The impure dicalcium phosphate precipitate obtained from the first liming step 3 is filtered as indicated on the drawing by reference numeral 6 and the filtrate is returned to the settling tank through line 7. The filter cake is a dicalcium phosphate of fertilizer grade containing about 38–39% $P_2O_5$; it is preferably dried and then discharged through line 8 into a rotating drum or other suitable mixing device to be mixed with strong phosphoric acid in accordance with the process of the invention.

The precipitate resulting from the second liming step 5 is likewise filtered in a filtering step 10, with return of the filtrate to the settling tank that ordinarily precedes the filter. The resulting filter cake is a product of high purity, containing not more than 0.1% by weight of fluorine, and contains about 75–80% of the phosphoric acid produced in the digester 1 as dicalcium phosphate. In the embodiment of the invention illustrated on the drawings, two-thirds of this material are withdrawn for sale as a cattle feed supplement and the remaining one-third is utilized for the preparation of strong phosphoric acid.

The reaction of sulfuric acid with the dicalcium phosphate for the production of strong phosphoric acid is indicated on the drawing as being carried out in a digester 11, although it will be understood that two or more digestion tanks in cascade may be utilized if desired. Digestion temperatures of about 140°–180° F. and sulfuric acid of about 55°–63° Baumé concentration may be employed if a gypsum filter cake is desired in the subsequent filtration step 12, or the temperature and the strength of the sulfuric acid may be so regulated as to produce a hydrated calcium sulfate cake. It is an advantage of the invention that these factors can be adjusted and regulated much more readily than in the digestion of tricalcium phosphate (phosphate rock) with sulfuric acid, wherein a greater proportion of sulfuric acid must be used.

The phosphoric acid obtained as filtrate from the filtering step 12 is reacted with the solid fertilizer grade dicalcium phosphate as indicated at 13 on the drawing, preferably by spraying through a perforated pipe projecting into a rotating drum provided with lifts to agitate the solids therein. By this procedure a thorough and uniform contact of the acid with the solid dicalcium phosphate is obtained and the following reaction occurs:

$$CaHPO_4 + H_3PO_4 \rightarrow CaH_4(PO_4)_2$$

If desired the mixture obtained from the mixing drum may be run into a den for aging until a homogeneous product is obtained, but it is preferably run directly into a drier 14. A rotating kiln wherein the superphosphate product is contacted with hot products of combustion may be used for this purpose, or a drier heated by closed steam coils may be employed if desired. In either case a dried superphosphate fertilizer product containing 50% or more of available $P_2O_5$ is produced.

It will be understood that the process illustrated on the drawing can readily be modified to meet varying demands for superphosphate fertilizer and for feed grade dicalcium phosphate in response to market changes. For example, the quantity of lime slurry added in the first liming step 3 can be increased to precipitate up to 50% of the phosphoric acid present as fertilizer grade dicalcium phosphate, the remaining 50% being precipitated in the second liming step 5. In this case all of the dicalcium phosphate obtained in the second liming step would of course be introduced into the digester 11 for use in the production of strong phosphoric acid, and no feed grade dicalcium phosphate would be obtained. Any desired proportions between about 20% and about 50% of the total phosphoric acid produced in the digester 1 can of course be precipitated in the first liming step 3, and therefore the process is well suited for the varying conditions of commercial production.

*Example 1*

An aqueous phosphoric acid partially purified from fluorine and silica by treatment with sodium chloride, settling and filtration and containing compounds of oxidized iron, aluminum and other metallic impurities of the phosphate rock, about 0.5% of free sulfuric acid and about 10% of $P_2O_5$ is treated in two successive steps with a cold aqueous slurry of hydrated lime to produce dicalcium phosphate. The liming is carried out in a series of tanks provided with suitable agitators and set in cascade with the slurry overflowing from tank to tank. A lime slurry having a 7–10% CaO content and a temperature of about 75°–100° F. is preferably employed.

When the process is operated to produce both a feed grade and a fertilizer grade dicalcium phosphate the quantity of lime added in the first step is such as to precipitate only about 15–25% of the $P_2O_5$ content of the phosphoric acid. For this purpose about 200 parts by weight of 10% lime slurry are used for each 1000 parts by weight of the dilute phosphoric acid solution the quantity being such as to bring the pH of the solution to 3.0. This precipitates substantially all of the remaining fluorine and the metallic impurities in the solution along with about 25% of the phosphoric acid. A satisfactory precipitate may contain, for example, about 55–60 parts by weight of $CaHPO_4 \cdot 2H_2O$, 2.8 parts of $CaSiF_6$ and 22–23 parts of $CaSO_4 \cdot 2H_2O$ together with the phosphates or hydroxides of practically all of the iron, alumina and other metallic impurities. The resulting slurry is preferably thickened in a settling tank to form a sludge which is filtered on a rotary vacuum filter and dried.

The overflow from the thickener is pumped to a second set of liming tanks where it is diluted with water to a 7% solution and treated with an additional quantity of the same 10% lime slurry to bring it to a final pH of about 4.8–6.3. Approximately 600 parts of the lime slurry are required for each 1000 parts of the original 10% phosphoric acid solution in this step. The resulting slurry is thickened and the sludge is filtered; the filter cake, after drying, is a pure dicalcium phosphate of feed grade.

In applying the principles of the present invention to this process one-third of the dried feed grade dicalcium phosphate is reacted with sulfuric acid which is preferably of a strength such as to form a precipitate of gypsum crystals. Acids of 55°–62° Baumé may be used. For example, a quantity of the feed grade dicalcium phosphate containing 63 parts by weight of $P_2O_5$ is reacted with 46.8 parts by weight of 77% sulfuric acid in the digester 11 at a temperature of 140°–190° F. and preferably at about 170° F. The resulting calcium sulfate hemihydrate is filtered off and the phosphoric acid solution, which contains 51.4% $H_3PO_4$, is mixed with 63 parts of the above-described dried precipitate from the first liming step to form approximately 100 parts of the desired fertilizer product.

The phosphoric acid is preferably combined with the fertilizer grade dicalcium phosphate in a rotary kiln wherein the acid is sprayed over the finely divided solids as they are agitated by lifts set in the walls of the kiln. The resulting superphosphate fertilizer is dried in a second rotating drum by contact with the products of combustion of gas or fuel oil to a moisture content of about 1%. The dried product has a $P_2O_5$ content of 51.5% of which 51.3% is available $P_2O_5$.

*Example 2*

The procedure of Example 1 produces approximately 100 parts by weight of superphosphate fertilizer for each 125 parts of feed grade dicalcium phosphate. Larger proportions of fertilizer can of course be obtained simply by increasing the quantity of dicalcium phosphate that is reacted with sulfuric acid; for example the entire capacity of the plant can be converted to fertilizer production by either of the following procedures.

The first liming step may be modified by adding sufficient of the aqueous lime slurry to precipitate 50% of the phosphoric acid in the solution. This will require approximately 400 parts by weight of 7–10% CaO lime slurry for each 1000 parts of dilute phosphoric acid of 10% $P_2O_5$ content and will form about 126 parts of fertilizer grade dicalcium phosphate which is filtered off and dried. The remaining phosphoric acid solution is again limed to a final pH of about 5.5 and the resulting precipitate is filtered off, dried and reacted with 93.2 parts of 60° Baumé sulfuric acid to produce a 51% $P_2O_5$ solution containing 71.8 parts of phosphoric acid. After separating the calcium sulfate hemihydrate by filtration this solution is reacted with the dried precipitate from the first liming step. A typical fertilizer produced by this procedure has the following analysis:

| | Percent |
|---|---|
| Total $P_2O_5$ | 50.5 |
| Water-soluble $P_2O_5$ | 21.6 |
| Available $P_2O_5$ | 50.5 |
| Moisture | 2.2 |

If the capacities of the filters and driers used in recovering the product from the first liming step are such that the above-described procedure is not feasible the same result can be accomplished simply by mixing one-third of the feed grade dicalcium phosphate product of Example 1 with the dried fertilizer grade material of that example and treating the mixture with the strong phosphoric acid obtained by reacting the remainder of the feed grade material with 55°–60° Baumé sulfuric acid. By this procedure the same output of superphosphate fertilizer is obtained with equipment originally designed for feed grade dicalcium phosphate production. It will be evident that the principles of the invention are such that other dicalcium phosphate mixtures may be reacted with sulfuric acid with equal facility, and that any desired variation between the limits outlined above may be obtained.

What I claim is:

1. A method for the production of concentrated superphosphate fertilizer which comprises adding lime to aqueous phosphoric acid in a quantity sufficient to precipitate from about 20% to about 50% of the $P_2O_5$ as dicalcium phosphate, separating the resulting precipitate, adding lime to the remaining phosphoric acid until a pH of about 4.8–6.3 is attained and thereby producing a precipitate of more highly purified dicalcium phosphate, separating the second precipitate, digesting a quantity of the second precipitate approximately equal in dicalcium phosphate content to that of the first precipitate with sulfuric acid of a strength such as to produce directly an aqueous phosphoric acid of about 40–50% $P_2O_5$ content, and reacting the phosphoric acid so obtained with said first precipitate to produce a superphosphate fertilizer.

2. A method for the production of concentrated superphosphate fertilizer and feed grade dicalcium phosphate which comprises adding to aqueous phosphoric acid a quantity of lime sufficient to produce a pH of about 2.5–3.2 and thereby precipitating about 15–25% of the $P_2O_5$ content of the phosphoric acid as fertilizer grade dicalcium phosphate, separating the resulting precipitate, adding lime to the remaining phosphoric acid until a pH of about 4.8–6.3 is attained and thereby precipitating the remainder of the phosphoric acid as feed grade dicalcium phosphate, separating the second precipitate, withdrawing approximately two-thirds thereof as feed grade dicalcium phosphate, digesting the remainder with sulfuric acid of a strength such as to produce directly an aqueous phosphoric acid of about 40–50% $P_2O_5$ content, and reacting the phosphoric acid so obtained with said fertilizer grade dicalcium phosphate and thereby producing a superphosphate fertilizer.

References Cited in the file of this patent

UNITED STATES PATENTS

| 1,818,114 | Carothers et al. | Aug. 11, 1931 |
| 1,891,007 | Palazzo | Dec. 13, 1932 |
| 2,013,970 | Moore et al. | Sept. 10, 1935 |
| 2,043,238 | Curtis | June 9, 1936 |
| 2,108,940 | MacIntire | Feb. 22, 1938 |
| 2,181,933 | Block et al. | Dec. 5, 1939 |